United States Patent
Gerard (10) Patent No.: US 8,347,628 B2
(45) Date of Patent: Jan. 8, 2013

(54) POWER GENERATION DIRECTLY FROM COMPRESSED AIR FOR EXPLOITING WIND AND SOLAR POWER

(76) Inventor: Henry M. Gerard, Capistrano Beach, CA (US)

(*) Notice: Subject to any disclaimer, the term of this patent is extended or adjusted under 35 U.S.C. 154(b) by 377 days.

(21) Appl. No.: 12/800,671

(22) Filed: May 19, 2010

(65) Prior Publication Data

US 2011/0041501 A1 Feb. 24, 2011

Related U.S. Application Data

(60) Provisional application No. 61/274,614, filed on Aug. 18, 2009.

(51) Int. Cl.
*F01K 25/02* (2006.01)
(52) U.S. Cl. .......................................................... 60/650
(58) Field of Classification Search ............... 60/650, 60/659, 682, 641.8
See application file for complete search history.

(56) References Cited

U.S. PATENT DOCUMENTS

| | | | | |
|---|---|---|---|---|
| 2,638,741 A | * | 5/1953 | Putman, Jr. ................ | 60/39.17 |
| 3,786,631 A | * | 1/1974 | Manning et al. ............ | 60/641.1 |
| 3,797,247 A | * | 3/1974 | Schwartzman ............. | 60/682 |
| 3,996,741 A | * | 12/1976 | Herberg .................... | 60/398 |
| 4,003,786 A | * | 1/1977 | Cahn ......................... | 376/322 |
| 4,100,745 A | * | 7/1978 | Gyarmathy et al. ........ | 60/652 |
| 4,751,814 A | * | 6/1988 | Farrell ...................... | 60/39.183 |
| 4,885,912 A | * | 12/1989 | Nakhamkin ................ | 60/652 |
| 5,473,899 A | * | 12/1995 | Viteri et al. ................ | 60/684 |
| 5,685,155 A | * | 11/1997 | Brown et al. ............... | 60/698 |
| 6,378,287 B2 | * | 4/2002 | Griffiths ..................... | 60/39.17 |
| 7,086,231 B2 | * | 8/2006 | Pinkerton ................... | 60/650 |
| 2005/0210878 A1 | * | 9/2005 | Ashikian .................... | 60/659 |
| 2007/0095069 A1 | * | 5/2007 | Joshi et al. ................. | 60/772 |
| 2009/0016876 A1 | * | 1/2009 | Senoo et al. ............... | 415/199.5 |
| 2009/0145103 A1 | * | 6/2009 | Nakhamkin ................ | 60/39.182 |

* cited by examiner

*Primary Examiner* — Thomas Denion
*Assistant Examiner* — Ngoc T Nguyen
(74) *Attorney, Agent, or Firm* — Leonard Tachner (57) ABSTRACT

This invention relates to a Compressed Air Turbine-Generator, or CAT-G that will enable the ability to manage energy gathered from ecologically friendly sources, such as solar and wind power. Compressed Air Energy Storage, (C.A.E.S.), is a promising mode of clean energy storage. A major challenge facing this technology is the need to efficiently convert the compressed air energy into electricity. Conventionally, high-pressure air is used only to improve the efficiency of a conventional jet powered turbine generator. The focus herein is on a new technology that efficiently converts the energy stored in compressed air directly into electrical power without producing greenhouse byproduct gases or other pollutants. This new capability will add important flexibility to the optimization of ecologically friendly energy systems.

16 Claims, 10 Drawing Sheets

POWER GENERATION DIRECTLY FROM COMPRESSED AIR FOR EXPLOITING WIND AND SOLAR POWER

CROSS-REFERENCE TO RELATED APPLICATIONS

This application takes priority from provisional application Ser. No. 61/274,614 filed on Aug. 18, 2009.

BACKGROUND OF THE INVENTION

1. Field of the Invention

The present invention relates to a novel machine (the Compressed Air Turbine-Generator, or CAT-G) to manage energy gathered from renewable sources, such as solar and wind power. Compressed Air Energy Storage (C.A.E.S.) is a promising mode of clean energy storage. A major challenge facing this technology is the need to efficiently convert the compressed air energy into electricity. Commonly, the high-pressure air is used only to improve the efficiency of a conventional jet-powered turbine generator. The focus herein is on a new technology that efficiently converts the energy stored in compressed air directly into electrical power without producing greenhouse byproduct gases or other pollutants. This new capability will add important flexibility to the optimization of ecologically friendly energy systems.

2. Background Discussion

Figure 1:
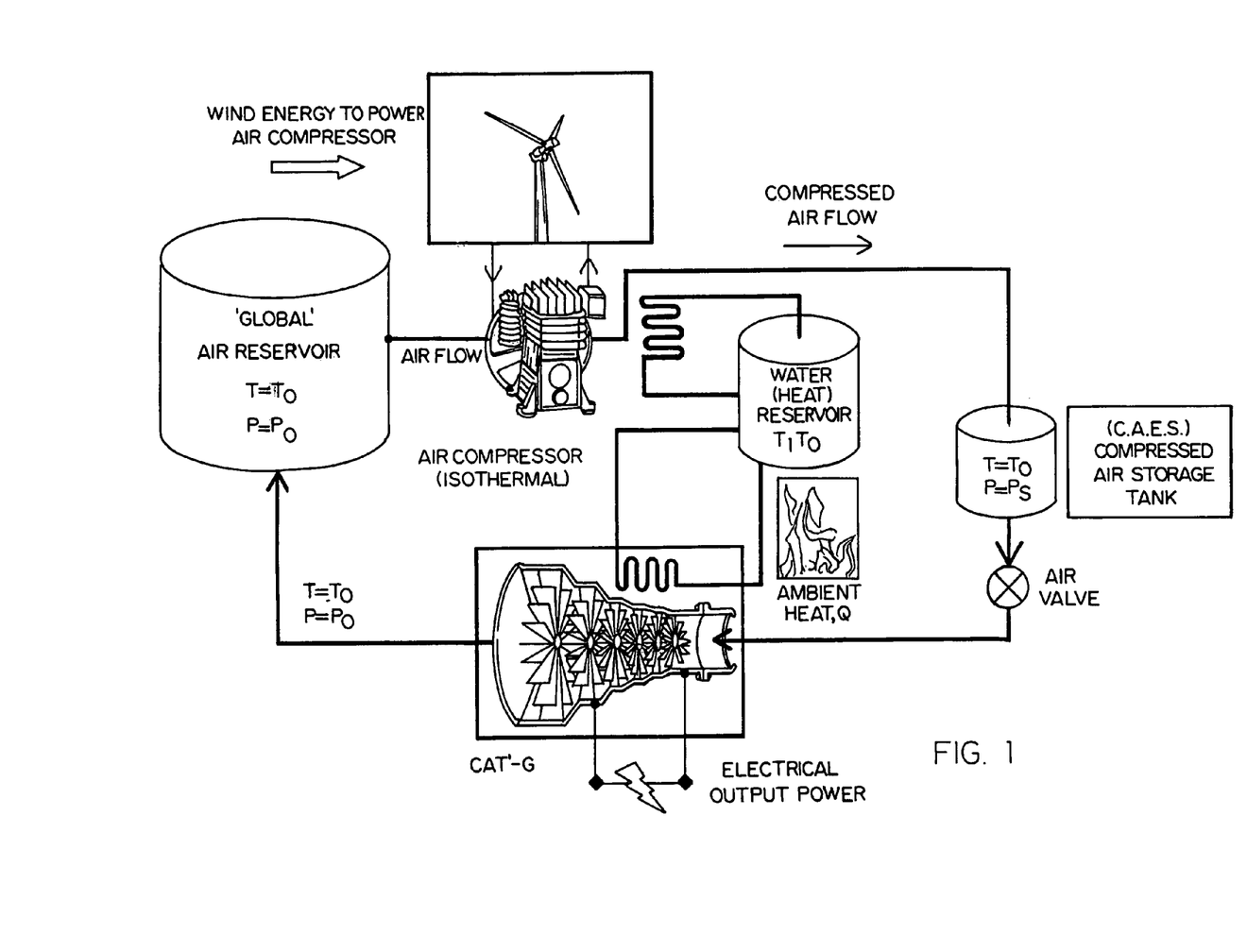
FIG. 1 is a schematic diagram of the preferred embodiment of a compress air energy storage and recovery system.

A common deficiency of many Renewable Energy schemes is the lack of an effective way to store the energy for use when the source is not operational. Wind and solar power provide such challenges. FIG. 1 shows a practical system that is based on the compression of air and the storage of energy (in a "Heat" and a "Pressure" Reservoir) at ambient atmospheric temperature, $T_O$. It illustrates that wind power can be used to compress air (from the atmosphere) so that high pressure air goes into a 'C.A.E.S. Energy Storage Reservoir' and the energy from the constant temperature (Isothermal) air compression flows (as heat) into a Water (Heat) Reservoir. (Heating the water in this tank does raise its temperature slightly so that, in general, $T_{WATER} \geq T_O$; but this elevation in temperature is not critical to the storage-recovery process).

An obvious advantage of this configuration is that the energy stored at $T_O$ is not lost by dissipation to the environment. Any energy reservoir that is hotter than $T_O$ must lose energy to colder regions by convection, conduction and radiation. With the energy reservoirs held at, or near $T_O$, thermal convection, conduction and solar heating helps stabilize the energy reservoirs, as energy (via heat-flow) is consumed in the recovery part of the storage-recovery process.

It is also apparent that a vital element of this scheme is a means for recovering the stored energy from the reservoirs and delivering it in a useful form. Although the focus herein is on the design and operation of the CAT-G, it is important to remember that the behavior of the energy reservoirs (including the Earth's atmosphere) at $T \approx T_O$ must be understood as critical parts of the storage and recovery system.

SUMMARY OF THE INVENTION

The invention described herein is an axial turbine system that functions in the manner of a cascaded set of shrouded windmills, often called a ducted fan system.

Figure 2:
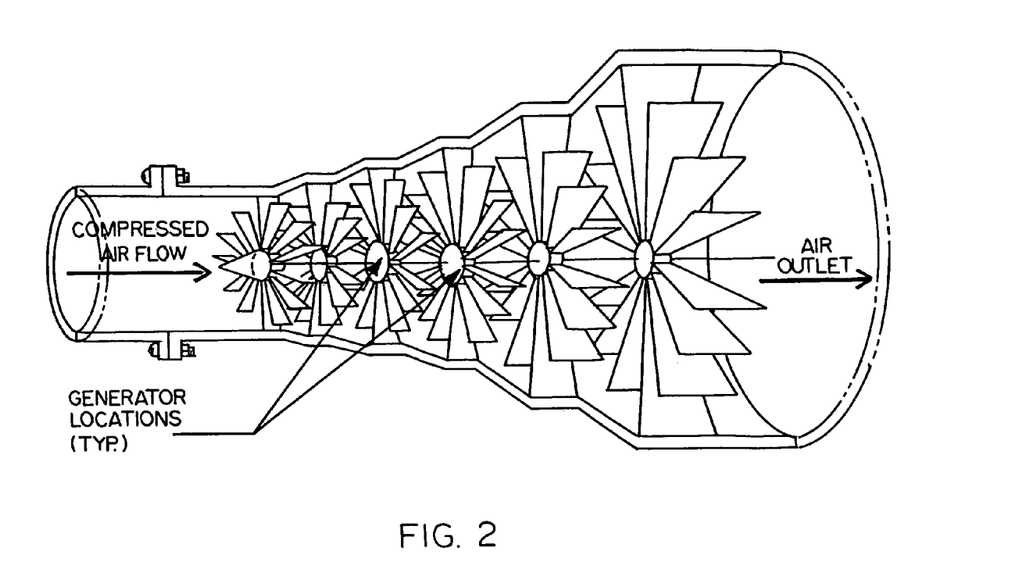
FIG. 2 is a diagram of a 6-stage compress air turbine generator (CAT-G)

As shown in FIG. 2, the blades of the turbine stages act as the blades of windmills. As high pressure drives air past the blades, turbine rotation extracts mechanical energy and also reduces the pressure of the expended air. The mechanical energy extracted by the turbine stage is converted to electrical energy in a convenient manner. In this system, the airstream cannot deflect around the rotating blades as in a conventional windmill. It must flow through the blades and along the axis of the system. The airstream, having given up some energy to the $1^{st}$ stage of rotating blades, exhibits a pressure drop and an increase in volume. Absent a source of heating within the CAT-G, there would typically also be a reduction in temperature that is both significant and progressive. By means of the inter-stage heating, energy from the Water (Heat) Reservoir is added to the decompressed air, and this air is thereby returned to $T_O$ (ambient temperature). With increasing temperature, the air stream (periodically) regains some pressure as it passes through the CAT-G. Because the air stream contains additional energy that can be extracted, a second set of blades is placed downstream of the first. As the volume of the air has expanded in the first rotor, the blades of the second rotor must be somewhat longer.

The overall design challenge is to optimize the air flow, the heat exchange, the blade size, shape and rotation speed to maximize the overall efficiency of energy recovery.

In summary, the turbine stages cause the air pressure to be stepped down, stage by stage, from the high entry pressure to atmospheric pressure at the outlet. As the air expands, heat is supplied from an ambient temperature reservoir. This increases the air pressure and temperature as necessary for efficient energy recovery. The addition of heat is vital for energy recovery in the CAT-G. Thus, maintaining the compressed air at (or near) $T_O$ at certain points in the CAT-G is a critical design element that is discussed in detail below.

The principal design goal of the CAT-G is to achieve high efficiency for energy recovery from stored compressed air and heat, converted into electricity.

Consider two ways of adding energy to an air storage reservoir. First, the air can be compressed quickly, which increases both pressure and temperature. If no heat is drawn off (into a heat reservoir), this process increases temperature sharply. Second, pressure can be increased slowly (allowing heat to be drawn off into a reservoir that is roughly at ambient temperature) so that the air compressed into the high-pressure storage reservoir remains at ambient temperature. Thermal contact with a heat reservoir leads only to increased pressure (not temperature) in the air reservoir. In the C.A.E.S. application, where compressed air is a medium for energy storage, it is desirable to avoid raising air temperature as energy is easily lost from high temperature storage reservoirs by heat flow to cooler surroundings. Processes (of the first kind) that do not involve adding or removing heat are called Adiabatic. However, as shown in FIG. 1, the CAT-G is used in conjunction with a system based on the second kind of compression process, called Isothermal. Below, the physics of storing energy by either adiabatic or isothermal compression of air is described and compared.

The air compressor in FIG. 1 is cooled by water from the Water (Heat) Reservoir, where energy from isothermal compression is retained, (slightly) raising the temperature of the large volume of water within this reservoir. To be most effective, this reservoir must readily exchange heat with its ambient environment (e.g., the atmosphere). It therefore cannot retain the added heat from the compression of air for any long time. Even if some of the stored energy from isothermal compression was dissipated (and this reservoir was to cool back to $T_O$), sufficient energy remains to provide the necessary heating inside the CAT-G.

To accomplish the high efficiency goal stated above, an important design principle is that the air flow through the CAT-G must approximate a constant temperature (isothermal) process. This is because isothermal compression followed by isothermal expansion back along the same path would ideally permit complete (100% efficient) energy recovery. In pursuing this goal, it is important to avoid the numerous factors (including heat loss from the system) that can prevent recovery of some stored energy. The design goal of the CAT-G is to duplicate (but in the reverse direction) the constant temperature process by which air was initially compressed into the storage reservoir. Therefore, an important requirement is that energy must be converted to electricity without changing the air temperature at the entrance of each CAT-G stage.

In theory, it is possible to use any compression process and then completely recover the stored energy as long as there is a process that can be used to restore the system to its initial configuration. The selection of an isothermal compression process is based on the ability it provides to avoid heat losses from the system's reservoirs. For example, if we were to begin with ambient air and use adiabatic compression for energy storage, the temperature of the air storage reservoir would rise to about 509° F.! Using a high temperature reservoir would facilitate the recovery process as it would make it easier to recover the adiabatic work using a machine like the CAT-G, as no injection of heat would be needed between the stages. By starting with appropriately high temperature air, the air reservoir would contain sufficient energy that an expansion sequence based only on adiabatic expansions of air could result in energy recovery with an exhaust that is at $(P_O, T_O)$. Using high temperature reservoirs is, however, an impractical approach for long-term storage because such reservoirs necessarily dissipate heat by convection, conduction and radiation losses to the cooler environment. This lost energy cannot be returned to a high temperature heat reservoir without additional work. The heat loss is thus an irreversible process.

Therefore, by choosing isothermal compression, the complexity of providing loss-less heat storage transforms into one of providing a means to effectively supply energy, by means of heat flow (from a $T_O$ reservoir), to the air flow between the CAT-G rotors. This required energy is supplied from the same reservoir that was used to absorb the heat from isothermal air compression (i.e., it is essentially gleaned from the atmosphere); and, such heat addition must be included to establish a (quasi) inverse to the isothermal compression process.

There are, of course, many additional requirements involved in approximating ideal reversibility (including avoiding turbulence in the airstream and minimizing friction); but with only a discrete number of compression (reheating) sections the CAT-G expansion process can be, at best, only a rough, piecewise fit to the isothermal compression curve. Fortunately, we will also see that the fit is close enough to provide a remarkably good thermodynamic efficiency for energy recovery that is above 90%.

The mechanics of extracting energy from the pressurized airstream in the CAT-G relies on the aerodynamic properties of the rotors. A detailed aerodynamic analysis is yet to be done, however some basic principles are worth noting. Two important blade design factors are Tip Speed Ratio, TSR, and Power Coefficient, $c_p$, (not to be confused with the Heat Capacity of Air at constant pressure, $C_p$).

TSR=$\Omega R/v$, where $\Omega$ is the speed of rotation (radians/s) and v is the air flow rate (the free-stream-velocity of the wind).

Figure 3:
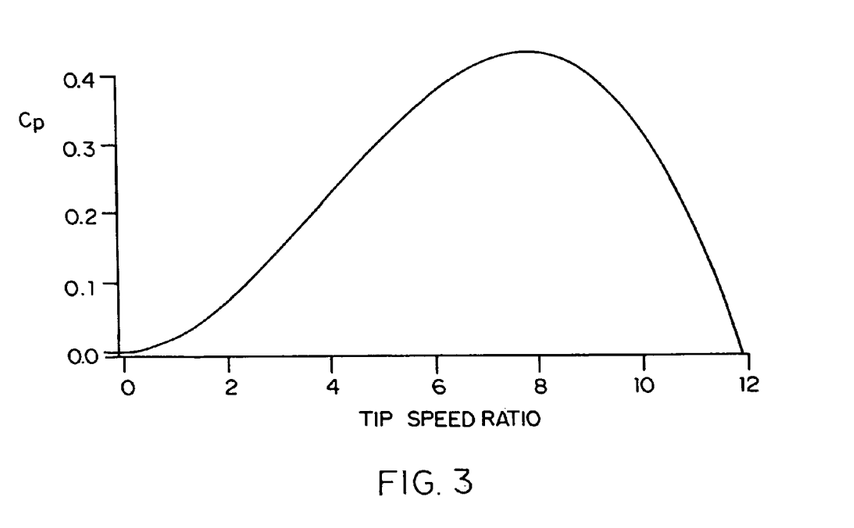
FIG. 3 is a graph of power coefficient versus tip speed ratio in a CAT-G.

FIG. 3 shows the relationship between TSR and $c_p$; a principal element in the design of the CAT-G rotors. FIG. 3 corresponds to an unshrouded rotor. We assume that the aerodynamic characteristics of the shrouded rotors within the CAT-G behave in a similar manner.

First, it is important to note that $c_p$ peaks to slightly more than 40% for a TSR of about 8. Thus, designing near this peak will provide energy extraction of about 40% per-stage. This is consistent with an assumption of a pressure (and energy) drop of about 40% per stage that is used in the example that follows.

Second, it is important that the CAT-G stages can have different rotational speeds. To maintain TSR of about 8 in stages having different blade lengths, it is necessary that $\Omega R$ be constant for each stage (specifically, $\Omega R \approx 8$ in general). Therefore, $\Omega$ must decrease, as the stage volume increases, proportional to 1/R.

Total efficiency can be estimated (in the ideal case of no losses due to turbulence, friction, etc.) for a 6-stage CAT-G having each stage designed to extract 40% of the energy from the airstream. If each stage passes 60% of the input energy (and extracts 40%), the relative outlet energy will be only 0.6 to the power 6 (about 0.047) implying that the sum of the extracted energy is about 0.953, i.e. 95.3% efficiency! Unfortunately, this simple approximation does not account well, quantitatively, for the thermodynamic work of adiabatic expansion in the rotors combined with heat replacement. Although all the energy stored during compression cannot be recovered, the ideal thermodynamic efficiency, $\epsilon$, is still respectably high.

The turbine stages cause the air pressure to be stepped down, stage by stage, from the high entry pressure to atmospheric pressure at the outlet. As the air expands, heat is supplied from a water (heat) reservoir at ambient temperature. This increases the air pressure and temperature is necessary for efficient energy recovery. The additional heat is vital for achieving high CAT-G recovery efficiency. Thus, maintaining the compressed air at (or near) $T_O$ at certain points in the CAT-G is a critical design element that is discussed in detail below.

In summary, the CAT-G operates as follows:

1. Compressed Air in the C.A.E.S. reservoir acts like a compressed spring that releases some energy (from the internal energy of the air) to the $1^{st}$ rotor.

2. The pressure head in this reservoir pushes the air along the CAT-G axis, through a compression section, containing heat exchangers, where energy from the "Heat Reservoir" reloads the spring by restoring the air to ambient temperature.

3. The energy recovery process continues, with subsequent rotors extracting energy from the "air-spring", and subsequent heat exchangers restoring this energy, until there is no longer sufficient pressure head in the CAT-G to move the air through another reheating stage. At this point, the spent air leaves the CAT-G outlet.

The principal benefit of the CAT-G comes from its compatibility with ambient temperature energy reservoirs. This is the basis for its capability to provide electrical power on a 24/7 basis (i.e., after an indefinite storage time) without consuming fossil fuel or producing any greenhouse gas byproducts, whatsoever. During periods of solar or wind energy generation, excess power (that which is not sent to a grid for immediate use) is used to drive air pumps and establish an energy reserve by forcing compressed air into air-tight storage chambers (e.g., subterranean caverns from depleted pools of oil or gas); and heat into the large heat reservoir (which can then be allowed to cool back to ambient temperature). The CAT-G is the critical element for efficiently converting the stored energy (C.A.E.S. and stored heat) directly into electricity. Because CAT-G operation does not require high temperatures, velocities or stresses, the equipment can be both low cost and durable.

Besides providing a safe and inexpensive means of implementing large energy stores, C.A.E.S. technology also benefits from the fact that compressed air (and the energy it carries) can be transported long distances simply via pipelines. It may prove beneficial to move compressed air in this manner from the renewable energy fields to distant points of storage and/or use. Local reservoirs of ambient temperature water can be readily provided and kept warm by atmospheric and solar heating. It may even prove effective, by the use of pipeline networks, to distribute high pressure air from many wide-spread regions of collection. This could prove beneficial for stabilizing wind-power reserves and for providing stored energy buffers close to the CAT-G that may be useful for minimizing electrical transmission line losses by allowing the CAT-G facilities to be situated close to the points of electricity usage.

BRIEF DESCRIPTION OF THE DRAWINGS

The aforementioned objects and advantages of the present invention, as well as additional objects and advantages thereof, will be more fully understood herein after as a result of a detailed description of a preferred embodiment when taken in conjunction with the following drawings in which:

FIG. 9, comprising FIGS. 9A and 9B, provides in 9A a graph of temperature profile along the axis of a CAT-G and in 9B a graph of pressure profile along the CAT-G of 9A.

DETAILED DESCRIPTION OF A PREFERRED EMBODIMENT

It is unusual to discuss a turbine system where high pressure air is the source of input energy. The conventional turbine-engine is typically designed to draw in low pressure air which when used to burn hydrocarbon fuel (the source of input energy) generates a jet of high pressure output gas. This high pressure output can be used to produce either thrust, when it is ejected at high velocity (as in a turbojet aircraft engine), or mechanical power when it is used to spin a conventional jet turbine generator. In either case, the high pressure output produces enormous power. The CAT-G is clearly not a conventional turbine. However similar it is in design, there are some significant differences:

1) it consumes no fuel;
2) the relative amount of energy in the input air and the output air are reversed;
3) the design objectives and optimization criteria are reversed in that the principal goal for the CAT-G is to achieve maximum efficiency of the mechanical conversion of compressed air energy and heat into electrical power, whereas the principal goals for a conventional turbine are to maximize burn efficiency and thrust;
4) the CAT-G must be designed for a rate of exhaust flow that is as slow as practical. (energy exhausted in the form of a high velocity output air flow is wasted. In a conventional turbine engine exhaust flow is as fast as practical. Furthermore, high air flow speed through the CAT-G would also exacerbate the difficulty of effective heat exchange within the compression sections.

There is one important similarity between the CAT-G and a conventional turbine engine design that warrants further discussion. In order to maximize power (either thrust or electrical output), it is clearly preferable to operate the turbine-generator over the highest practical overall pressure differential. Based on aerodynamic effects (such as shown above in FIG. 3), there are physical limits on the pressure differential that can be supported across a single rotor stage. In conventional turbine design it is therefore common to cascade several stages in an axial flow configuration to achieve the highest practical end-to-end pressure differential. It is reasonable to assume that this design approach will also apply to the CAT-G. Accordingly, for purposes of this discussion (and in correspondence with the configuration shown in FIG. 2 and the data in FIG. 3), we consider the maximum one-stage pressure differential to be about 40%. It follows that six axially cascaded stages combine to produce an overall pressure difference of about 8:1. Based on the Ideal Gas Law (at constant temperature) gas volume increases by the same ratio as pressure decreases. So, to be consistent with tracking an isothermal expansion curve, we might expect the volume of each successive stage of the representative CAT-G to increase by 40%. However, the dominant work mechanism for air expanding through a rotor is adiabatic rather than isothermal. Volume expansion is therefore governed by adiabatic, not isothermal properties of air. Furthermore, pressure is increased after expansion in every stage. Because there can be only a small (in practice, finite) number of compression (heating) sections (6, in our example), the representative pressure-volume expansion profile along the axis of the CAT-G is actually described by a 6-step piecewise approximation to the smooth P-V curve that is the $T_O$ Isotherm corresponding to an expansion/compression ratio of 8:1. Notably, as shown along the x-axis in FIG. 7, the actual per-stage volume increases are not uniform (as they would be for true isothermal expansion), and the actual trans-rotor pressure drops (calculated for the 8:1 pressure differential) are substantially less than 40%.

The operation of the Compressed Air Driven Turbine-Generator is as follows:

High-pressure air from an external compressed air storage system is input to the first turbine stage at a controlled pressure and flow speed, and at ambient temperature.

This air expands adiabatically against the resistance of the blades of the first rotor stage. This rotor is loaded by an electrical generator to extract energy. The first stage rotor and related generator are designed to extract a specific quantity of energy.

The presence of a $T_O$ heat exchanger behind the first rotor is necessary to warm the air back to $T_O$, and raise the air pressure in the larger volume compression section that precedes the second stage rotor.

Because of the extraction of energy by the first rotor (which is accompanied by a drop in pressure) mechanical energy is imparted to the blades and to the rotating shaft to which they and the generator are physically attached. It is important to constrain the electrical generator power output in order to control the rotor speed (with each stage rotating independently of the others) so that each rotor functions at its peak efficiency.

The design of the second turbine stage is similar to the first except it must have a somewhat larger diameter to accommodate the volume expansion of the air exiting the first rotor.

Air flow speed must adjust with pressure and temperature throughout the CAT-G, to maintain constant mass-flow for the airstream.

Stationary deflector blades (stators, not shown in FIG. 2) are placed behind each rotor to keep the flow optimally aligned with respect to the CAT-G axis (i.e. the blades of the downstream rotating stage). It is likely that the mechanisms for heat-exchange will be integrated with these stators.

Systematically, stages with increasing diameter are cascaded so as to:
  extract electrical power as the air pressure is reduced by the adiabatic work delivered to the upstream turbine blades;
  maintain designated profiles along the turbine axis for air pressure, temperature and flow rate;
  inject heat and extract energy, stage by stage, until atmospheric pressure and ambient temperature are reached at the system outlet; and,
  generate electrical energy at every turbine stage that is combined to form the total turbine-generator energy output.

Compressed air is an attractive medium for energy storage because of its simplicity; and, through the use of the CAT-G, it is also attractive for the direct generation of electricity. The principal benefits of C.A.E.S. technology as described herein are that it:
  utilizes durable and inexpensive equipment, such as storage tanks and pipelines, which can be made from composite materials;
  is environmentally friendly in that "spills" do not produce any environmental hazards (as escaping material would merely be air or warm water);
  is relatively safe in that an accidental release of compressed air energy primarily emits a low mass material (air) which even at a high velocity does not have the potential to do serious damage or injury as a result of the transfer of a great deal of momentum; and,
  can effectively use concrete and steel shell enclosures to contain any fragments originating from the rupture of high pressure tanks or pipelines in a manner that seems straight-forward and inexpensive; the main requirement being adequacy to prevent high strength, low density materials, such as plastic composites or fiber glass, from escaping containment.

CAT-G electrical power generation requires that compressed air energy is supplied from the site of the storage location to the site of the CAT-G. Compressed air technology can be used to both transport the stored energy and to convert it into electrical power, but it is important to note when designing the system, that the required pressures and flow rates are different for each case.

Calculations suggest that significant power, in very high pressure compressed air form, may be piped even relatively long distances with a low pressure drop. Because wind forces are erratic, it may be advantageous to use a high pressure pipeline approach to link several compressed air storage tanks to the compressed air 'collection' sites, as well as, to the CAT-G sites. For example, using a 20" diameter (smooth) high pressure pipeline, a relatively low flow rate (e.g., 2.2 $ft^3$/s) and a relatively high pressure (e.g., 470 atmospheres), 10 MW of power can be transmitted from a point of power collection to another point (of use or storage) up to 50 miles away with less than 12% loss (i.e., pressure drop). Air does have finite viscosity, and because it interacts with pipe walls as it flows, transmitting substantial power by means of high pressure pipelines requires careful engineering to avoid turbulence and excessive pressure drops.

In contrast, using the CAT-G requires comparatively lower pressures and higher volumes of air flow (but not necessarily higher flow speed). In our example, the CAT-G is configured for a range of pressure head of only 8 to 22.4 atmospheres. Therefore, with pressure at 22.4 Atm and cross-sectional area about 1.0 $m^2$ flow speed of 1.75 m/s yields a power of about 20 MW.

In summary, if the wind or solar energy collection sites are far from the energy storage sites, it may be advantageous to move the energy directly through high pressure pipelines with moderate flow rates, and thereby avoid the use of electrical transmission lines and electric-powered air compressors located at the C.A.E.S. reservoir. For the CAT-G unit to operate effectively, compressed air energy should be supplied at comparatively low pressure and high mass flow rate. It follows that the CAT-G units should be placed relatively close to the energy reservoirs that support them.

Fundamentally, power generating capability is determined by the overall pressure drop across the CAT-G, the rate of airflow and the length of the turbine blade (i.e., the cross-sectional area of airflow). Power capacity increases with flow rate because of the increased input rate of compressed air energy. However, there is a point of diminishing returns where efficiency begins to drop off with incremental increases of flow speed. This is because the amount of kinetic energy lost to the output air stream becomes significant at higher flow rates (it is also likely that high flow rates will interfere with heat exchanger effectiveness). This behavior is demonstrated by the calculated results in FIG. 6 (for the 6-stage CAT-G configuration that is depicted in FIG. 2) operating with an input pressure range of 8 to 22.4 atmospheres.

Figure 4A:
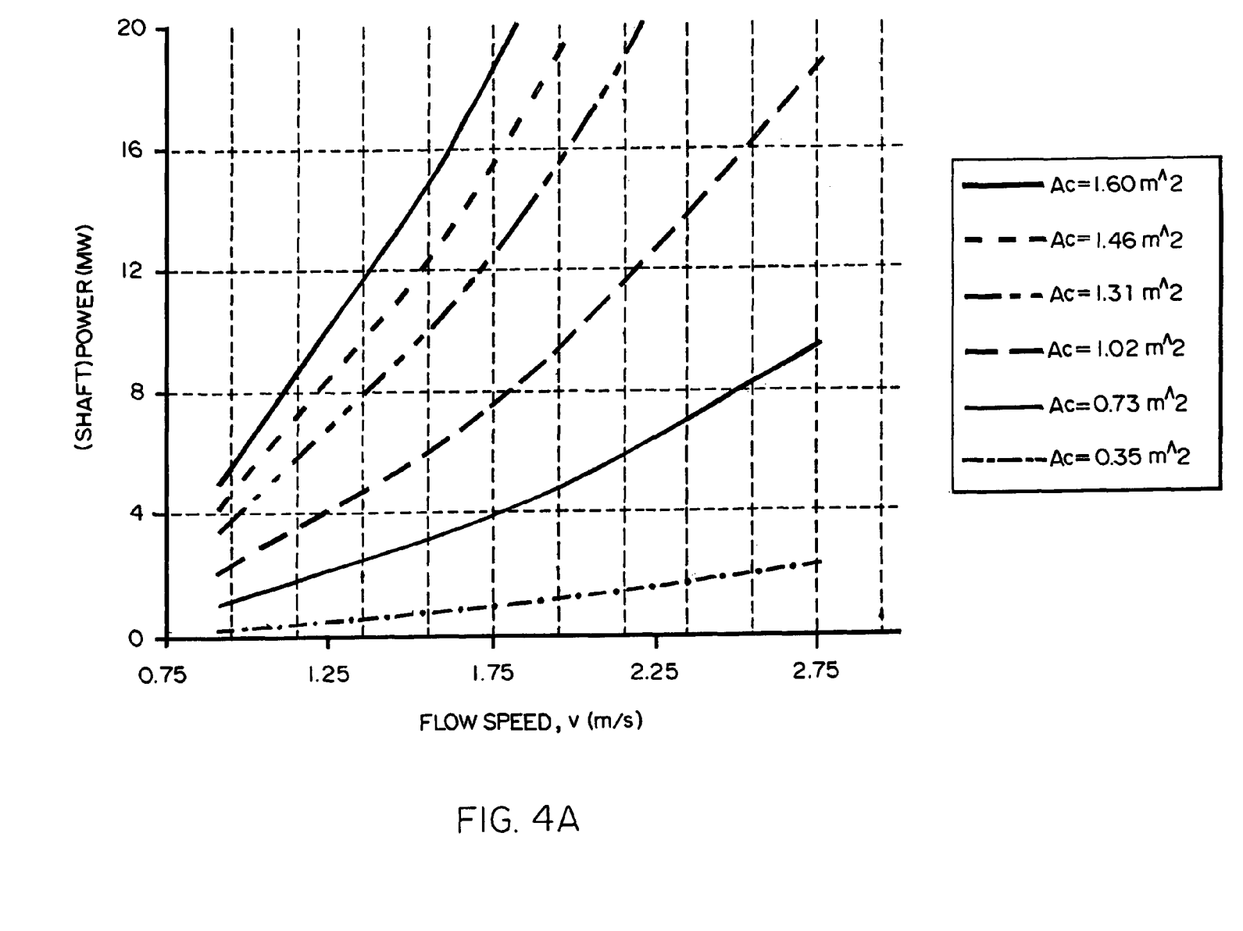
FIG. 4A is a graph of calculated output (shaft) power versus flow for a 6-stage CAT-G with 8:1 compressed air ratio generator.
Figure 4B:
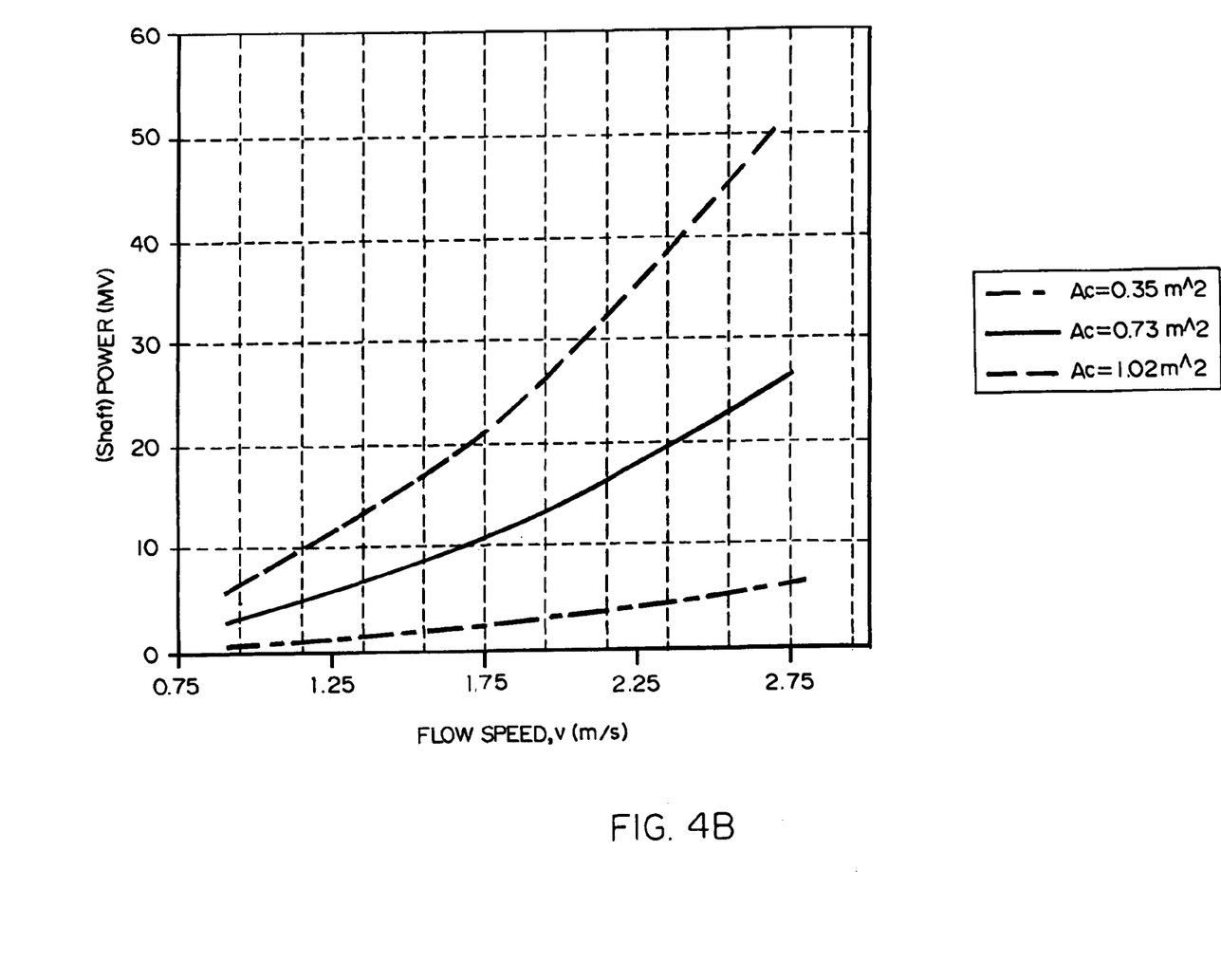
FIG. 4B is a graph of calculated output (shaft) power for a 6-stage 22.4:1 compressed air generator.

For a constant input cross-section (e.g. Ac=1.02 $m^2$) FIGS. 4A and 4B show that output power increases with flow rate. It shows, further, that output power in the multiple megawatt range is achievable with a realistic scale of design. FIG. 4 also illustrates how at a constant flow (e.g. look vertically along Flow Rate=1.25 m/s) output power increases with turbine area. These results were calculated using the same thermodynamic model that produced Table 1.

Figure 5:
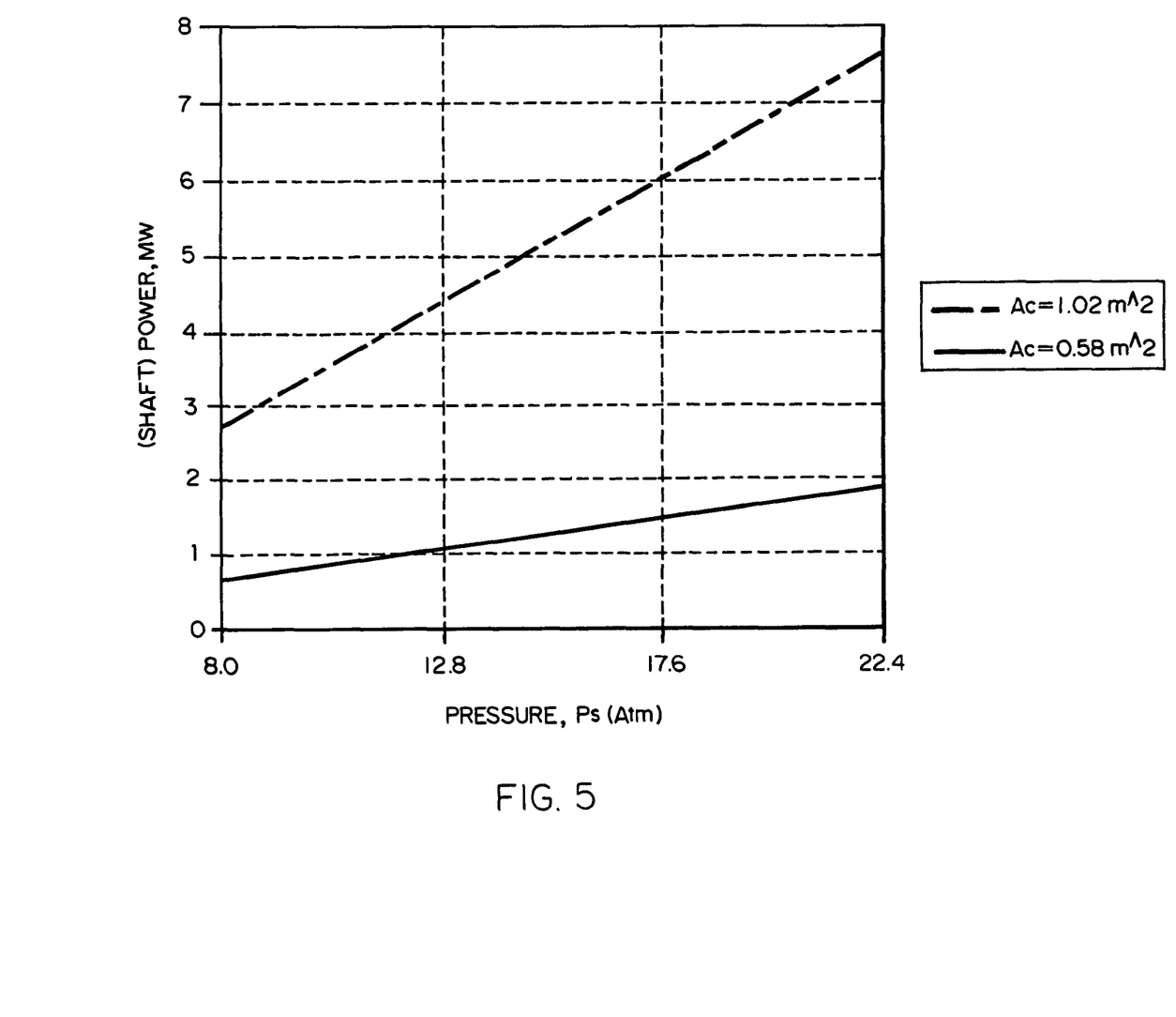
FIG. 5 is a graph of calculated output (shaft) power versus pressure for a 6-stage CAT-G with flow speed $v_0$=0.91 m/s.

FIG. 5 shows that power increases with input pressure; and that substantial power is produced even with relatively small cross-section and low flow speed. This figure also shows that about 2 MW can be obtained with v=0.91 m/s and merely Ac=0.58 $m^2$. However, Table 1 shows that for this case, with $P_S$=22.4 Atm, the CAT-G output stage is 18.3 times larger than Ac, and this would correspond to a cross-sectional outlet area that is about 3.7 m in diameter. Thus, for many lower power (smaller) applications, such as for the 'Air Car' described below, it may be desirable to design with relatively low values of Ac and high v.

Figure 6:
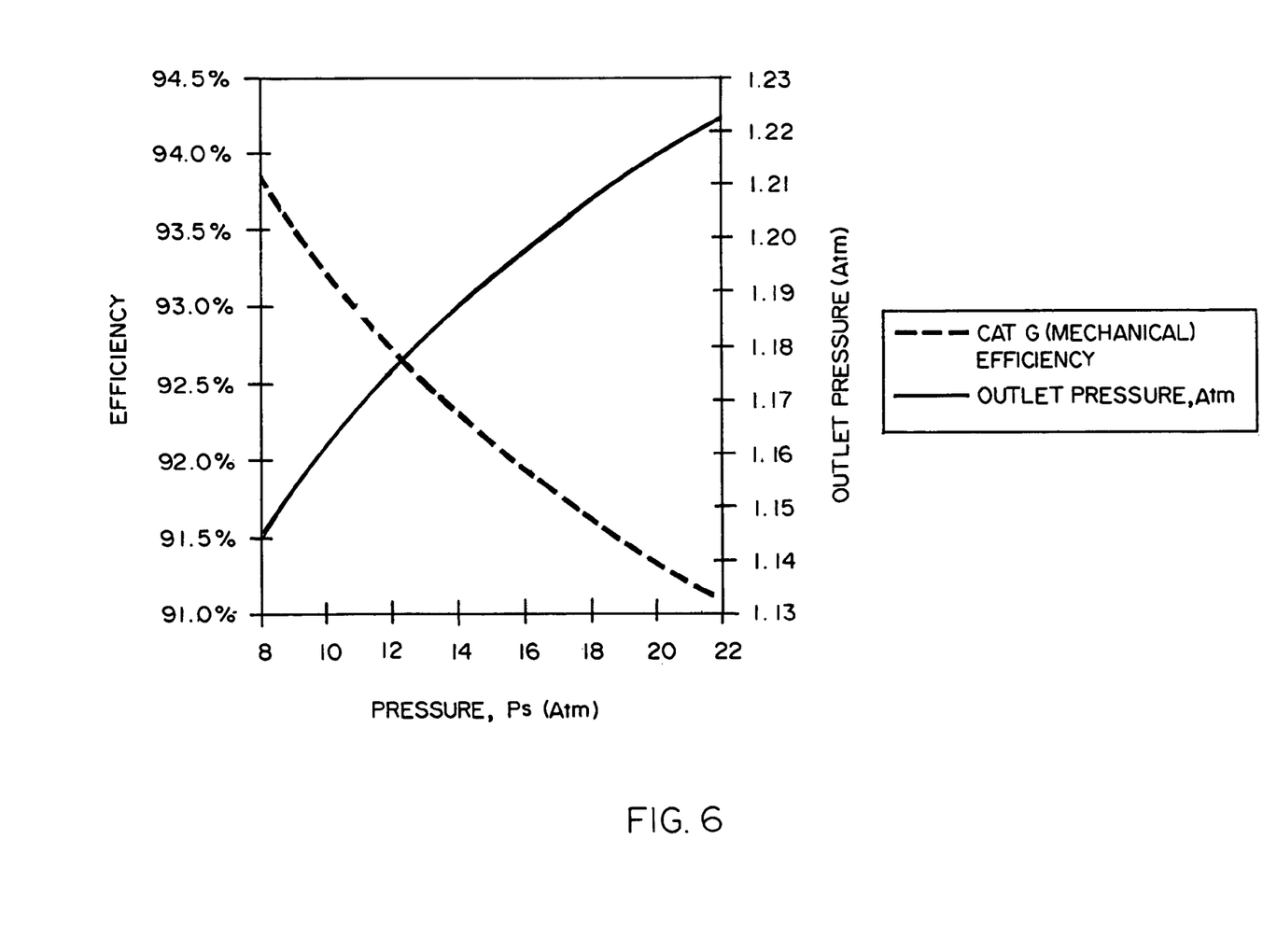
FIG. 6 is a graph of calculated 6-stage CAT-G efficiency versus pressure.

FIG. 6 shows that CAT-G efficiency drops slightly and output pressure increases with $P_S$. Outlet flow speed increases with outlet pressure, and therefore the amount of initially stored energy that is expended as kinetic energy also increases. The velocity of expended air v is controlled by the aerodynamic design of the CAT-G and is, therefore, and important design variable for determining power. Power and efficiency calculations are based on treating the air flow speed $v_0$ into the CAT-G as an independent variable. The aerodynamics of flow through the CAT-G determines the actual value of $v_0$ that will result from the pressure drop applied across it. An extended model that includes blade design and other properties that control impedance to flow is thus needed to complete the design of a CAT-G device. Increasing this speed reduces efficiency.

There are some basic scaling relationships that are worth noting. For example, one might wish to reduce the CAT-G complexity by employing only 4 stages instead of the 6 shown in FIG. 2. Assuming the per-stage pressure ratio is unchanged, it follows that the overall pressure head would drop by ½. To generate the same total power, flow volume must therefore double. This can be accomplished by increasing the cross sectional area of the flow channel (i.e., increasing blade length) or the flow rate, or both. Increasing area results in a longer blade, and hence, a lower rate of rotation. Increasing flow rate would reduce the CAT-G efficiency. Alternatively, for constant power output, the working pressure head could be increased. This would necessitate using more (than 6) stages which could have shorter blade lengths and slower air flow speed.

This discussion has so far ignored the important issue of rotor design. The basic principles for this design are well understood, but the aerodynamic tradeoffs are complex. As for any rotor, blade shape must be determined so that they work efficiently over their entire length. The number of blades in the rotor must correspond with the relatively low flow speed and high torque desired. Their shape, number, rotational speed and dimensions need to be set to maintain axial (non-turbulent) airflow from stage to stage. The blades must be designed (in conjunction with the generator loads) to provide a controlled interaction with the (heated) airstream such that the extracted work just equals that corresponding to the adiabatic pressure drop at each stage.

As stated earlier, the isothermal compression of air is a familiar, simple and, in principle, a reversible process. The challenge here is to have the air expand and deliver work to a rotor system, and also approximate an isothermal process. This requires the effective injection of heat between the turbine stages. That is, aerodynamic flow must progress from the relatively cold outlet of a turbine rotor, through a region where heat is added, progressively raising air temperature and pressure, until ambient temperature is attained at the point of entrance to the successive rotor. We demonstrate by technical analysis below that such flow is both realistic and practical.

The following is an analysis that is helpful in understanding the physics of C.A.E.S., including the pressure, volume, temperature and energy relationships. A specific example is considered where the energy is stored at a pressure of 8 Atm, in correspondence to the input pressure for the 6-stage CAT-G (discussed above). The analysis includes the relationship between the volume of the reservoir, the pressure and the total energy stored.

In general, conservation of energy requires that heat added to a gas, $\delta Q$, equals the work done by the gas, $\delta W$, plus the change in internal energy of the gas, $\Delta U$.

Adiabatic Compression: When the heat is unchanged, the process is called adiabatic, and $Q=\Delta U+W=0$. Hence; $\Delta U=-W$, and change in internal energy, $\Delta U$, equals the work done on the system $(+)W$. For an adiabatic process, $W_A=\Delta U_A$; the change in internal energy. It is well known that for an adiabatic process $\delta W_A=C_V(T_i-T_f)$, and $(T_f/T_i)=(P_f/P_i)^\alpha$, where $\alpha=(\gamma-1)/\gamma$, $\gamma=C_P/C_V$, and $C_P$ and $C_V$ are the heat capacities of air at constant pressure and volume, respectively. Therefore, if air compression were performed adiabatically, the final air temperature would be higher by a factor of $(P_S/P_O)^\alpha$. For $P_S/P_O=8$, this factor is about 1.79; and for an initial temperature of 300 K the final temperature would be 537 K, or 509° F.

Isothermal Compression: A process that is performed in equilibrium with a thermal reservoir. is called isothermal. While heat does flow between the air and the reservoir, the temperature does not change. As internal energy is a function only of temperature, $\Delta U_I$, the isothermal change in internal energy, equals zero. Hence, for the isothermal process, $W_{ISO}=-Q_{ISO}$, the work done on the system equals the heat that flows into the reservoir.

It is well known that for an ideal gas $PV=nRT$, where P, V, n, R, and T are, respectively, pressure, volume, number of moles, molar gas constant and absolute temperature. Furthermore, the work performed by isothermal compression $W_{ISO}$ from state $(P_O, V_O)$ to state $(P_S, V_{STORE})$ is given by:

$$W_{ISO} = \int_{V_O}^{V_{STORE}} PdV,$$

which for an ideal gas, leads to $W_{ISO}=nRT_O \ln(P_S/P_O)$ $=P_S V_{STORE} \ln(P_S P_O)$.

Thus, we see that stored energy increases with pressure and is proportional to the volume of the air reservoir, $V_{STORE}$.

Comparison of Work Required for Adiabatic and Isothermal Compression to $(P_S, V_{STORE})$: It is relevant to note that it would require significantly more work to arrive at state $(P_S/V_S)$ by first performing an adiabatic compression to $P_S$, and follow this by cooling at constant pressure to temperature $T_O$. This adiabatic compression from $P_O$ to $P_S$ raises the temperature from $T_O$ to $T_{SA}$, where $T_{SA}=T_O(P_S/P_O)\alpha$. The associated adiabatic work is therefore $C_V T_O[(P_S/P_O)^\alpha-1]$. Bringing the air to $T_O$ requires cooling to remove heat, $Q=C_P T_O[(P_S/P_O)^\alpha-1]$. Thus, compressing adiabatically requires extra work that amounts to "wasted energy" when the goal is to arrive at state $(P_S, V_{STORE})$. This excess work is:

$-W_A+Q=(C_P-C_V)T_O[(P_S/P_O)^\alpha-1]=nRT_O[(P_S/P_O)^\alpha-1]$
$=P_S V_{STORE}[(P_S/P_O)^\alpha-1]$ with $(P_S/P_O)=8$ the excess work is about $0.79\ P_S V_{STORE}$. Hence, for an 8:1 compression, the excess is about 38% of the total isothermal work required to compress the air from $(P_O, V_O)$.

The following describes the relationship between the quantity of energy stored isothermally, to the air reservoir volume, $V_{STORE}$, and storage air pressure, $P_S=22.4$ Atm. The calculations are based on isothermal air compression at ambient temperature $T_O$ as shown schematically in FIG. 1. In addition to this storage of compressed air, isothermal compression also produces heat, $\Delta Q$, that is stored in the Heat Reservoir in FIG. 1.

For energy storage at 22.4 Atm. (pressure ratio $(P_S/P_O)$ =22.4), the energy equation shows that the total stored energy, $\Delta Q$, is given by: $\Delta Q=W=P_S V_{STORE} \ln(P_S/P_O)$, hence with $P_S/P_O=22.4$ (and at $T_O$, 1 Atm being equivalent to 0.8 Watt-Hr per cubic foot of storage volume) we can express the stored energy density as $\Delta Q/V_{STORE}=8(0.8)\ln 22.4=55.7$ Watt-Hr per cubic foot of storage capacity.

We can determine, for example, the air storage volume necessary to provide a reserve of 1,000 MW-Hr at relative pressure of 22.4 atm. With $\Delta Q=10^9$W-Hr we see that that about 18 million cubic feet of storage space is required. While this seems like a huge space, in terms of storage in underground caverns, the requirement corresponds to a space about 10 feet high, spread over a square area that is ¼ mile on an edge.

Figure 7:
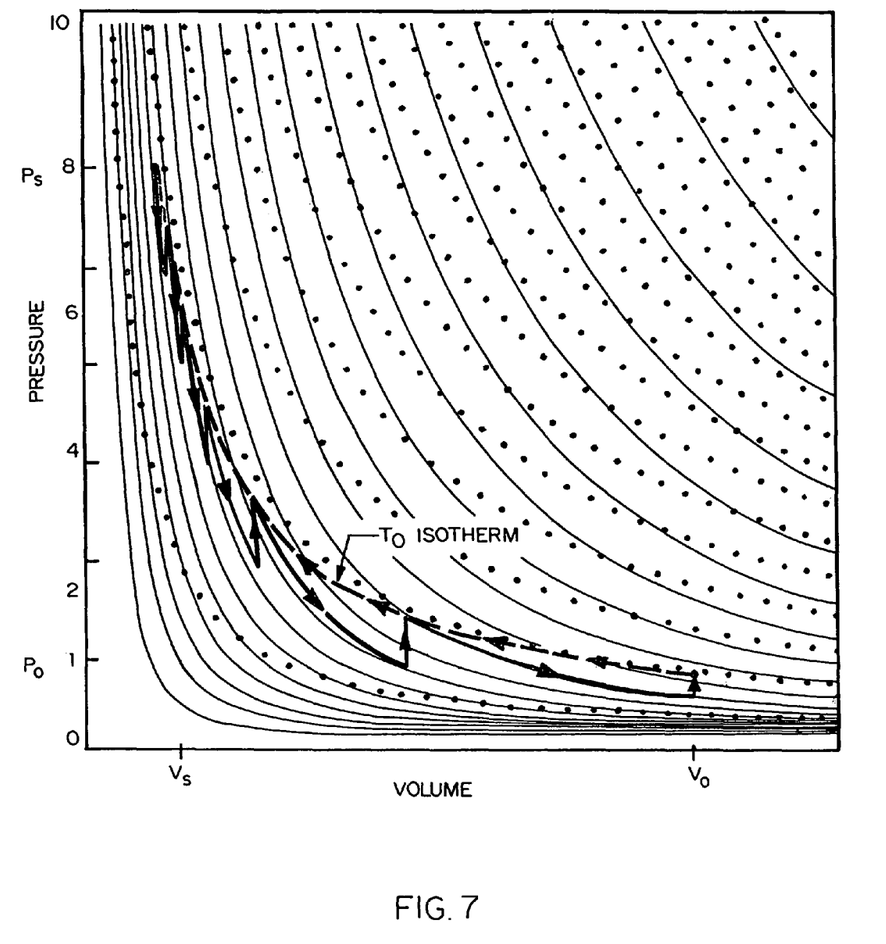
FIG. 7 is a graph of the thermodynamic cycle of C.A.E.S. energy storage and recovery with a 6-stage CAT-G.

As previously discussed, the thermodynamic cycle for the isothermal compression of air from ($P_O$,$V_O$) to ($P_S$,$V_{STORE}$) begins with compression along the dashed-line $T_O$ Isotherm in FIG. 7. This step provides the energy that is stored in the reservoirs, and which is issued to 'fuel' the energy recovery stage of the cycle.

In the discussion that follows, it is helpful to consider $V_S$ and $V_O$ as incremental volumes of air passing through the CAT-G that can be summed to equal the entire volume of stored air. The CAT-G expansion (or energy-recovery) process of FIG. 7 is shown by the heavy black line that zigzags downward from the point ($P_S$,$V_S$) in the upper left corner, to the point ($P_O$,$V_O$) in the lower right. The downward curved sections of the path follow adiabats (paths of constant heat), with each originating at $T=T_O$ (along an Isotherm such as denoted by a dotted line in FIG. 7). The adiabatic segments of the path illustrate the sharp drop in pressure associated with adiabatic work. A significant drop in temperature is also associated with each of these pressure drops.

In correspondence with the previously described CAT-G example, the pressure levels for each stage diminish, stage by stage, in 6 steps. The vertical segments in this path correspond to pressure increases caused by the addition of heat by the heat exchangers that follow each rotor. The heat exchangers are in thermal contact with the heat reservoir.

Because of the first adiabatic pressure drop from $P_S$ to $P_1$, the air cools to $T=T_{A1}$, but it is then reheated to $T_O$ in a compression section before entering the second rotor. The addition of heat $Q_1=C_v(T_O-T_{A1})$ raises the pressure (at constant volume). This addition of heat is vital to the energy-recovery process. The sequential pressure drops associated with adiabatic rotor-work followed by reheating to boost pressure continues along the axis of the CAT-G.

The energy-recovery path in FIG. 7 indicates that the sector volume increases very gradually in the first few stages. The increase in volume is more gradual than stated earlier (when describing isothermal air expansion) because adiabatic expansion follows a relationship whereby $PV^\gamma$ is a constant ($\gamma \approx 1.39$, for air), while for isothermal expansion, the exponent of V is 1! (Stage volume drops more slowly in the adiabatic process because of the higher exponent).

Figure 8:
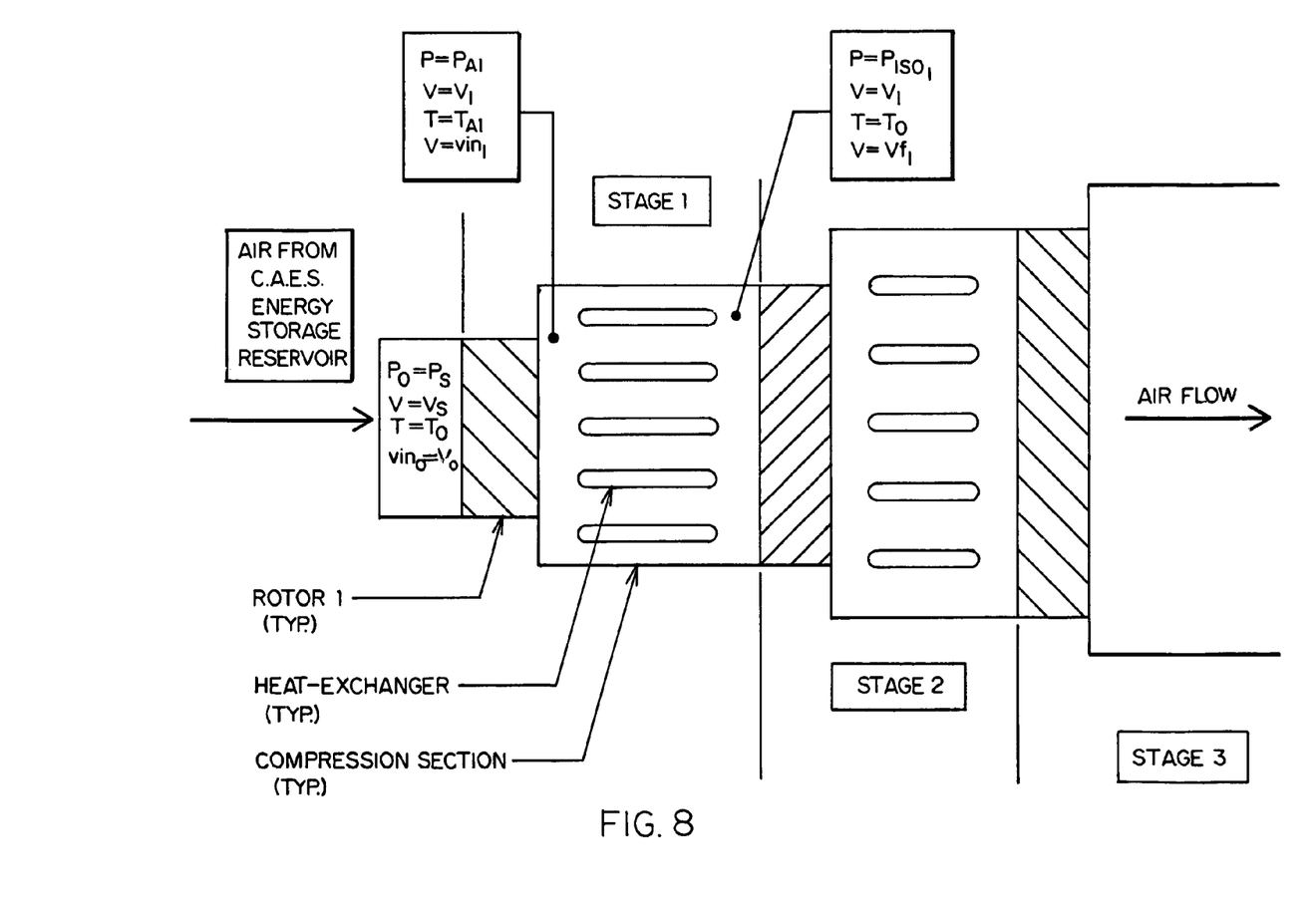
FIG. 8 is a cross-section of CAT-G showing heat exchangers to warm each CAT-G section to $T_O$.

For the purpose of simplification, the heat exchangers and the compression sections are not shown FIG. 2; a phantom-view of the CAT-G. FIG. 8 shows the cross-section of two representative rotor stages, including heat exchangers (also used as stators to promote axial air flow).

The cylindrical sections following each rotor contain a set of heat-exchange vanes that are aligned with the CAT-G axis. They are held at ambient temperature $T_O$ by means of circulation of fluid from the Heat Reservoir (See FIG. 1). Heating of the air stream corresponds to the vertical segments of the expansion path in the thermodynamic cycle of FIG. 7. As shown there, and in FIG. 9A and FIG. 9B (below), the addition of heat raises both the temperature and pressure along the axis of the compression section. Raising air temperature back to $T_O$ is required in order to bring the CAT-G expansion path back to the Compression Isotherm after the adiabatic expansion at each rotor.

Figure 9A:
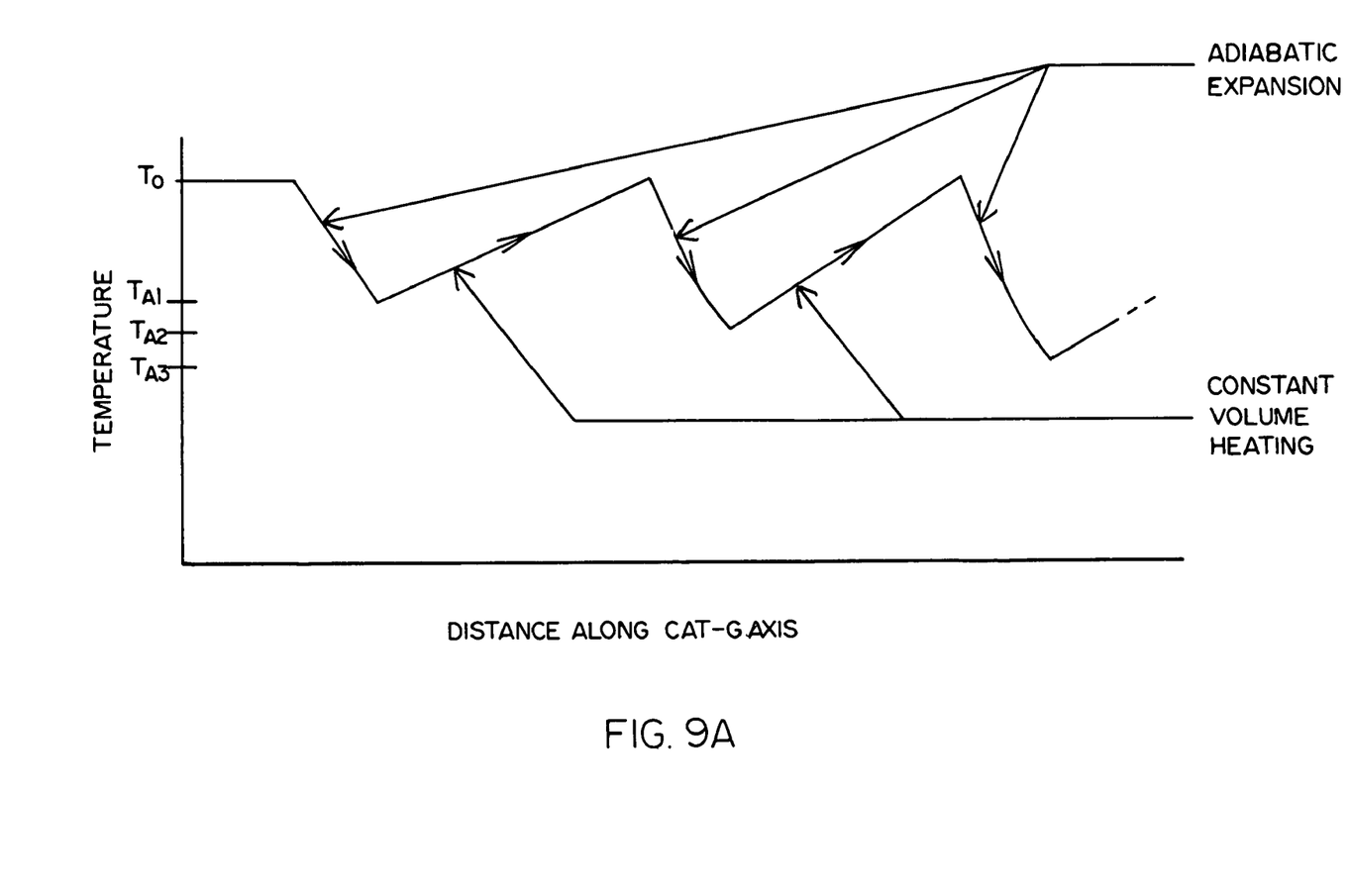

It is important to remember that as a consequence of adiabatic expansion in the rotor, the compression section is relatively cold at the input end, and (owing to the temperature of the Heat Reservoir that feeds the heat exchangers) is $T_O$ at the output end. Heat is added as air flows through the compression sections. FIG. 9a shows the temperature dropping within the rotor and then increasing along the length of this cylinder as heat is absorbed. The length of the compression section, the rate of heat addition and the flow velocity must be determined so that the temperature reaches $T_O$ at the end of each compression section. When this condition is achieved, the pressure at the end of the compression cylinder corresponds to that (at the input the corresponding stage) on the $T_O$ Isotherm in FIG. 7.

Figure 9B:
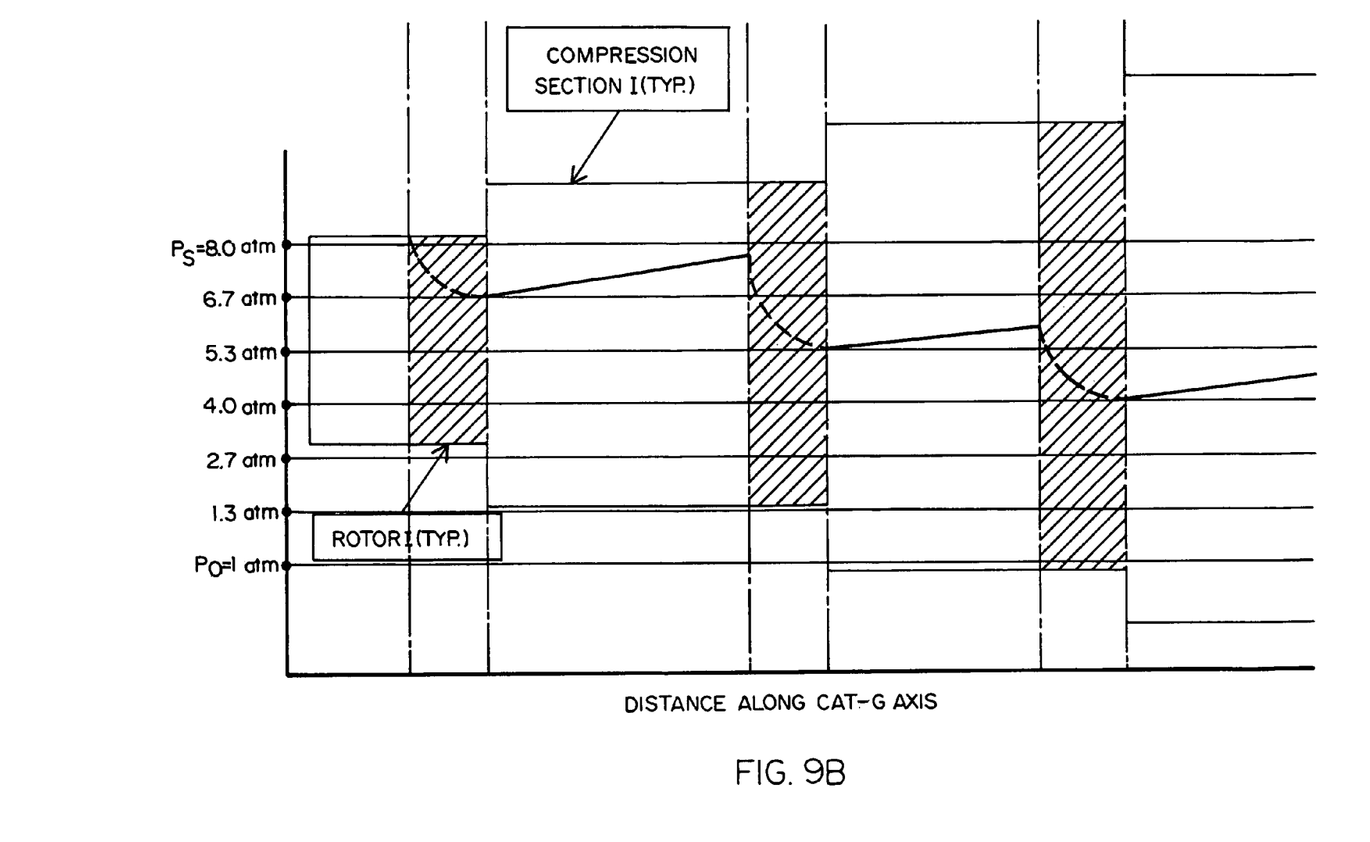

FIG. 9b shows pressure dropping within the rotor and then increasing as heat is absorbed in the compression section.

An important concern is depicted in FIG. 9b; namely, whether it is possible for the air stream to flow from the relatively cool, low pressure at a rotor outlet, to the relatively warm and higher pressure at the adjacent rotor input.

Because the compression sections and the heat exchangers are vital elements in which air flow occurs in the opposite direction to a pressure gradient; it is therefore essential to show that the thermodynamic variables do support such a flow. This is demonstrated by an energy analysis of a typical CAT-G section.

The energy analysis is based on Bernoulli's Equation which is expressed as:

$$Q=U_f-U_i+(v_f^2-v_i^2)/2 \text{ g}+y_f-y_i+P_fV_f-P_iV_i+W;$$

Where; Q is heat added to the system, U is internal energy, v is flow velocity, g is the acceleration of gravity, y is altitude, P is pressure, V is Volume and W is (shaft) work performed.

The feasibility of retrograde flow can be addressed by analyzing two adjacent regions of a CAT-G stage, namely, a rotor and the compression section that follows it. It is necessary that there is sufficient energy in the air stream for the flow to progress through the compression tube (and arrive at the input of the subsequent rotor). In other words, it is necessary that the final stream velocity (at the output end of the compression section) is not less than zero.

It will be demonstrated that starting with the C.A.E.S. conditions at the input to Rotor 1, with the compressed air at flow speed $v_0$ leads to a moving air stream at the rotor outlet (which is also the input to the compression section). Furthermore, analysis of the compression section shows that the (kinetic) energy associated with the air stream flow is exactly sufficient to counteract the adverse effect of the opposing pressure gradient caused by heating. At the end of the compression section, the air speed is the same as when it entered the rotor, and all the other thermodynamic variables at the input to the subsequent rotor are exactly the same as for the initial rotor. The one difference is that the pressure at rotor 2 drops in correspondence to the 1-stage transition down the Compression Isotherm, in FIG. 7.

The first part of this analysis provides the change in thermodynamic variables corresponding to the adiabatic expansion through Rotor 1. Here, Q=0, Δy=0, and from the 1st law of thermodynamics $\Delta U+W_{A1}=0$. With $vin_1=v_0$, the velocity at the outlet of the 1st rotor is given by:

$$(\text{Outlet velocity})^2=-2 \text{ g}(P_fV_f-P_iV_i)+(\text{Inlet velocity})^2$$

And noting that this outlet velocity equals $vin_i$ in FIG. 8, leads to:

$$vin_1^2=2 \text{ g}(P_SV_S-P_{A1}V_1)+v_0^2.$$

The second part deals with flow through the compression tube. Here, $Q=C_V(T_O-T_{A1})$, W=0, V=$V_1$, Δy=0, $P_i=P_{A1}$, $P_f=P_{ISO1}$, and (from the 1st law) ΔU=Q.

In this region Bernoulli's equation reduces to:

$$vf_1^2/2 \text{ g}=vin_1^2/2 \text{ g}-V_1(P_{ISO1}-P_{A1});$$

Substituting from above gives:

$vf_1^2/2\ g = (P_S V_S - P_{A1} V_1) - V_1(P_{ISO1} - P_{A1}) + v_o^2/2\ g$ or, $vf_1^2/2\ g = P_S V_S - P_{ISO1} V_1 + v_o^2/2\ g.$

The final step is to invoke the ideal gas law, which reminds us that both $P_S V_S$ and $P_{ISO1} V_1$ are equal to $nRT_O$, proving that:

$vf_1 = v_o.$

Thus, the retrograde flow required within the compression sections is physically realistic.

High energy recovery efficiency is important for a storage/recovery system to be practical. Calculations show that the CAT-G is capable of high thermodynamic efficiency. These calculations are an important and encouraging result. Poor efficiency would imply that the 'extra' equipment needed to fill the air and heat reservoirs (during windy days while electrical demand is consuming the full output of pre-existing facilities) might not be cost-effective. If the CAT-G had poor efficiency, energy from storage might therefore be much more costly than energy supplied directly from operating wind turbines or solar farms. A conventional thermodynamic approach is used to calculate ideal efficiency for the cycle described in FIG. 7.

Efficiency is the ratio of energy produced to energy input per cycle. The CAT-G delivers electrical energy, but, for present purposes, the efficiency of mechanical to electrical conversion (i.e. the generators and combiners) are not included as part of the efficiency calculation. Instead we will calculate the (shaft) work (i.e., mechanical energy) delivered by the CAT-G cycle relative to the input energy which compressed the air. Although, the thermodynamic efficiency equations are valid in general, $\epsilon$, as calculated here corresponds to the one particular CAT-G configuration, having 6 stages, which is used as our example and is both realistic and easy to analyze. No attempt has yet been made to optimize a detailed design for highest efficiency.

$\epsilon$ is given in general by:

$$\varepsilon = \frac{CAT - G\ Adiabatic Work}{Total\ Input\ Energy}$$

Where the total input energy is $W_{ISO}$, which includes the energy that produced the added heat $Q_{IN}$ that is drawn from the heat reservoir.

Calculation of Adiabatic Work: We begin by recalling that for adiabatic processes, $PV^\gamma$ is a constant. Furthermore, adiabatic work, $W_A$, done in transition from initial state, i, to final state, f, is given by:

$W_A = C_V(T_i - T_f)$

This, for our example leads to:

$W_A = C_V[(T_O - T_{A1}) + (T_O - T_{A2}) + (T_O - T_{A3}) + \ldots + (T_O - T_{A6})]$ For the $1^{st}$ stage adiabatic process, pressure is related to temperature by:

$$\frac{T_{Ai}}{P_i^{(\gamma-1)/\gamma}} = \frac{T_0}{P_S^{(\gamma-1)/\gamma}},\quad \text{Eq. (1)}$$

where the right-hand side corresponds to the temperature and pressure before the adiabatic expansion, and the left, after the adiabatic expansion. Similarly, volume before and after (with the same convention) is related to temperature by:

$$V_i \cdot T_{Ai}^{1/(\gamma-1)} = V_S \cdot T_0^{1/(\gamma-1)},\quad \text{Eq. (2)}$$

In the compression section, the quantity of heat added is given by:

$Q_{INi} = C_V(T_O - T_{Ai}).$

After this heating, pressure at the far end of the compression section rises to:

$$P_{ISOi} = \frac{P_S V_S}{V_i};\quad \text{Eq. (3)}$$

where $P_{ISOi}$ and the other three parameters in Eq. (3) all sit on the $T_O$ isotherm. Eq. (1), Eq. (2) and Eq. (3) can be iterated to calculate the intermediate pressures, volumes and temperatures through all the stages of a CAT-G. The thermodynamic parameters for all stages can be determined starting with a stated (chosen) pressure profile $P_i$ for the outlets of each rotor. For example, the input pressure at the $1^{st}$ rotor is $P_S$, the volume is $V_s$ and the temperature is $T_O$. Eq. (1) gives the temperature $T_{A1}$ after adiabatic expansion to specified pressure $P_1$. Eq. (2) gives the volume at the rotor outlet (i.e., the inlet to the $1^{st}$ compression section). Eq. (3) gives the (elevated) pressure at the outlet end of the compression section (i.e., the inlet to Rotor 2). In general, starting with rotor inlet pressure $P_{ISOi}$, and next stage (specified) rotor outlet pressure (from the design profile) $P_{(i+1)}$, Eq. (1) gives $T_{A(i+1)}$; Eq. (2) gives $V_{i+1}$, and Eq. (3) gives $P_{ISO(i+1)}$.

The thermodynamic properties of a 6-stage CAT-G were simulated in this manner using an Excel spreadsheet, The resulting parameters were used to calculate the (shaft) work $W_{Ai}$; and the heat input $Q_{INi}$ for each stage and also to calculate the sums of these quantities.

Finally, as was demonstrated above, the input work for isothermal air compression (as used to calculate the total energy stored in the C.A.E.S. reservoir) is:

$W_{ISO} = RT_O \ln(P_S/P_O)$, per mole.

Which, for the required isothermal work input to move one stage up the compression path along the $T_O$ isotherm from $P_{(i+1)}$ to $P_i$ is given by:

$W_{ISOi} = RT_O \ln(P_i/P_{(i+1)})$, per mole.

The overall efficiency of the CAT-G can readily be calculated from the sums of the per stage (shaft) work $W_A$ and the sums of the per stage work of isothermal compression $W_{ISO}$ using the familiar expression:

$$\varepsilon = \frac{W_A}{W_{ISO}}.$$

Calculated Efficiency: Throughout this document, a hypothetical pressure profile has been discussed whereby the pressure drops per rotor in 6 steps from the CAT-G inlet pressure to the outlet. Excel calculations using equal trans-rotor drops for every rotor revealed that most of the work was performed by the final stage. There, the pressure drop was over 50%. FIG. 3 shows that rotor blades do not work well at so large a trans-rotor pressure drop; therefore, such a pressure profile is not workable. The calculations presented from this point forward refer to a pressure profile that has a constant ratio for the 6 trans-rotor pressure drops.

Using the constant pressure ratio approach with 6 rotor stages and with $\gamma \approx 1.39$ for air and $P_S/P_O=8$ for the simulation gives 29.3% pressure drop across each rotor, and overall CAT-G efficiency of 93.9%. (See FIG. 6).

The tabulated values presented in Table 1 below correspond to $P_S/P_O=22.4$, which gives equal trans-rotor pressure drops of 40.4%, and an overall efficiency of 90.1%.

Table 1 below shows a representative thermodynamic calculation for a modified pressure profile that gives an overall efficiency of over 90%. This pressure profile is particularly attractive because it results in an equal percentage trans-rotor pressure drop across each rotor, and thereby allows every rotor to be set to operate at the peak $c_p$ coupling point (that is shown in FIG. 3). The table also shows that the optimal trans-rotor pressure drop for a 6-stage configuration is achieved with input pressure set at about 22.4 Atm. The conditions in Table 1, therefore, roughly correspond to the highest practical $P_S/P_O$ ratio for a 6-stage CAT-G. The table also presents the temperatures at each rotor outlet (in degrees Kelvin) and the volume of each stage (relative to $V_s=1\ m^3$). The 'Isotherm Pressure' is the pressure (in Atm) at the end of each compression section (i.e., when the temperature returns to 300K). $W_{Ai}$ is the adiabatic (shaft) work for each rotor; $W_{ISOi}$ is the work supplied to (isothermally) compress the air from $P_{ISO(i+1)}$, back to $P_{ISOi}$, and $Q_{INi}$ is the heat added in each compression section. All tabulated energies are in units of joules/mole. Efficiencies are presented for each CAT-G stage, and for the overall CAT-G (which is the ratio of $W_A$ to the sum of $W_{ISO}$ and $Q_{IN}$).

The value of total adiabatic (shaft) work $W_A$ is particularly useful as it can be readily converted to output power by noting that:

$$V_S = Ac \cdot v \cdot \delta t;$$

with output (shaft) power given by $W_A/\delta t$.

The number of 'moles' of air in volume $V_s$ is calculated from:

$$n \approx P_S \cdot 10^3/22.4 \text{ 'moles'}/m^3 \text{ at } T \approx 300K.$$

This approach to converting (shaft) work to (shaft) power was used as the basis for FIGS. 4, 5, 6A and 6B.

It will now be understood as a result of the disclosure herein of an exemplary embodiment, that the present invention is a method and apparatus for storing and generating electrical power from compressed air. It will also be understood that the invention herein provides a way for turning renewable energy sources such as wind mills and solar receivers into an electricity source when needed and where needed using a relatively high efficiency system of generating electric energy from compressed air.

The scope herein is not necessarily limited to the embodiments disclosed herein, but instead to the appended claims and their legal equivalents.

I claim:

1. An apparatus for generating electrical power from compressed air; the apparatus comprising:
   an axial turbine having a cascaded plurality of shrouded stages between an air inlet and an air outlet, the air inlet being at a pressure that is higher than the pressure at the air outlet,
   each said stage having a set of rotor blades for being propelled by said compressed air, the blades in said stages being greater in length at each successive stage toward said air outlet; and
   each such stage between said inlet and said outlet responding to an air pressure drop by causing rotation of a turbine shaft to generate electricity;
   further comprising a heat reservoir for maintaining the air temperature at each said stage equal to about ambient temperature.

2. The apparatus recited in claim 1 wherein said compressed air at said inlet is derived from an air compressor powered by a source of renewable energy.

3. The apparatus recited in claim 1 wherein the pressure of said compressed air at said inlet is in the range of 8 to 22 atmospheres.

4. The apparatus recited in claim 1 wherein there are at least two of said stages between said inlet and said outlet.

5. The apparatus recited in claim 1 further comprising a storage tank for storing said compressed air.

6. The apparatus recited in claim 2 wherein said source of renewable energy is a wind-powered generator.

7. The apparatus recited in claim 2 wherein said source of renewable energy is a solar-powered generator.

8. The apparatus recited in claim 1 wherein the air pressure at said outlet is at substantially 1 atmosphere.

9. A method for generating electricity from compressed air; the method comprising the steps of:

TABLE 1

Calculated Results for 6-Stage CAT-G with $P_s = 22.4$ Atm
[Energies are in joules/mole, with values tabulated for $V_s = 1\ m^3$]*

| Stage | Rotor Output Pressure Atm | Rotor Output Temperature K | Output Volume * Vs | Pressure Drop | Isotherm Pressure | WA | WISO | Qin | Efficiency |
|---|---|---|---|---|---|---|---|---|---|
| 0 | 22.40 | 300.00 | 1.00 | | 22.40 | | | | |
| 1 | 13.34 | 259.41 | 1.45 | 40.4% | 15.43 | 865 | 930 | 865 | 93.1% |
| 2 | 7.95 | 249.04 | 2.34 | 40.4% | 9.57 | 1086 | 1191 | 1086 | 91.2% |
| 3 | 4.73 | 246.20 | 3.88 | 40.4% | 5.77 | 1147 | 1264 | 1147 | 90.7% |
| 4 | 2.82 | 245.41 | 6.50 | 40.4% | 3.45 | 1164 | 1284 | 1164 | 90.6% |
| 5 | 1.68 | 245.19 | 10.90 | 40.4% | 2.05 | 1168 | 1290 | 1168 | 90.6% |
| 6 | 1.00 | 245.13 | 18.30 | 40.4% | 1.22 | 1170 | 1292 | 1170 | 90.5% |
| | | | | | | | | | Overall Efficiency |
| | | | | | Total | 6600 | 7251 | 6600 | 91.0% |

*Energy scales as $V_s$, which equals cross-sectional flow area of 1st rotor, Ac, multiplied by 1 meter of flow distance.

applying said compressed air to a first stage of an axial turbine for rotation of blades connected to a shaft for generating electricity;

permitting the pressure of said compressed air to be reduced in said first stage while causing the temperature thereof to be maintained at a substantially constant level through said first stage;

applying compressed air from said first stage to a plurality of subsequent stages for generating electricity in each such stage;

permitting the air pressure to be reduced in each of said subsequent stages until it is substantially at ambient pressure at the output of the last of said subsequent stages; and causing the temperature of air at each of said subsequent stages to be maintained at a substantially constant level;

wherein said steps of causing a substantially constant level of temperature at each said first and subsequent stage are carried out using a reservoir of fluid at ambient temperature and a heat exchange device at each said stage for carrying said ambient temperature fluid from said reservoir to said stage.

10. The method recited in claim 9 wherein the pressure of said compressed air at said first stage is between about 8 to 22 atmospheres.

11. The method recited in claim 9 wherein the compressed air is provided by an air compressor that is powered by a source of renewable energy.

12. The method recited in claim 11 wherein said source of renewable energy is a wind-powered generator.

13. The method recited in claim 11 wherein said source of renewable energy is a solar-powered generator.

14. The method recited in claim 9 wherein there are at least two stages in said plurality of subsequent stages.

15. The method recited in claim 9 wherein each such stage has a turbine rotor having a plurality of rotor blades.

16. The method recited in claim 15 wherein the length of said rotor blades at each such stage is substantially inversely proportional to the air pressure at each such stage.

* * * * *